United States Patent
Rivers et al.

[11] Patent Number: 6,028,858
[45] Date of Patent: Feb. 22, 2000

[54] ANI-DORMANT CONNECTIONS FOR FRAME RELAY

[75] Inventors: Henry Rivers, San Jose; Charles Corbalis, Saratoga; Muthu Muthuraman, Cupertino; Syed Rahman, San Jose; Paul Farah, Santa Clara; Shyla Bearelly, Sunnyvale, all of Calif.

[73] Assignee: Cisco Tenchology, Inc., San Jose, Calif.

[21] Appl. No.: 08/659,217

[22] Filed: Jun. 7, 1996

[51] Int. Cl.⁷ .................................................. H04L 12/56
[52] U.S. Cl. ........................... 370/352; 370/410; 370/462; 370/463; 370/522
[58] Field of Search .................................. 370/254, 355, 370/396, 397, 401, 409, 410–465, 466, 467, 402, 522, 524, 352, 356

[56] References Cited

U.S. PATENT DOCUMENTS

| | | | |
|---|---|---|---|
| 5,276,731 | 1/1994 | Arbel et al. | 379/88.2 |
| 5,361,259 | 11/1994 | Hunt et al. | 370/402 |
| 5,384,831 | 1/1995 | Creswell et al. | 379/88.26 |
| 5,390,232 | 2/1995 | Freeman et al. | 379/201 |
| 5,392,277 | 2/1995 | Bernstein | 370/55 |
| 5,408,528 | 4/1995 | Carlson et al. | 379/211 |
| 5,434,850 | 7/1995 | Fielding et al. | 370/321 |
| 5,440,620 | 8/1995 | Slusky | 379/100.07 |
| 5,490,141 | 2/1996 | Lai et al. | 370/60.1 |
| 5,521,909 | 5/1996 | Holloway et al. | 370/404 |
| 5,521,914 | 5/1996 | Mavraganis et al. | 370/402 |
| 5,537,461 | 7/1996 | Bridges et al. | 379/88 |
| 5,570,420 | 10/1996 | Bress et al. | 379/220 |
| 5,583,564 | 12/1996 | Rao et al. | 379/207 |
| 5,659,684 | 8/1997 | Giovannoni et al. | 370/465 |

Primary Examiner—Min Jung
Attorney, Agent, or Firm—Blakely, Sokoloff, Taylor, Zafman LLP

[57] ABSTRACT

A data communications network consists of a number of interconnected nodes and a network station having a memory. The memory stores a data base containing predefined circuit provisioning information for a number of users. A user accesses the frame relay network by dialing into the network via an ISDN connection. When the user calls into the network, signaling information is received at a first node of the network and passed to the network station. The signaling information includes automatic number identification (ANI) information which identifies the calling user. The network station uses the ANI to index the data base and retrieve associated circuit provisioning information. The circuit provisioning information is used to automatically install a circuit according to the predefined information. In this way, the user is provided with dial access to the frame relay network.

16 Claims, 1 Drawing Sheet

ANI-DORMANT CONNECTIONS FOR FRAME RELAY

FIELD OF THE INVENTION

The present invention relates generally to the field of packet switching network communications and, more specifically, to the provision of dial access to such a network.

BACKGROUND

Attempts to transfer data more efficiently than the traditional packet switching methods (e.g., X.25) have led to the development of a packet switching technique called frame relay. A frame relay network provides a number of interconnected nodes which are capable of receiving data frames from other network nodes and forwarding those data frames through to other network nodes to an ultimate destination. Nodes are interconnected by transmission paths, each of which supports one or more virtual circuits. Communication from one user to another can thus be made using the pre-defined network connections of the virtual circuits.

Frame relay networks support two types of virtual circuits: permanent virtual circuits (PVCs) and switched virtual circuits (SVCs). With a PVC service, the virtual circuit endpoints route through the frame relay network and PVC identifiers are determined when a user subscribes to the network. PVCs then are similar to leased lines in the sense that the physical connection is always present; call setup and teardown is implemented via commands issued by a network management system. SVCs have been referred to as virtual circuits "on demand". With SVCS, service requests are made on a signalling channel and the identifiers for the virtual circuit to be used during a network call are assigned at the time the call is established.

Users generally connect to a frame relay network through leased lines. The line originates at customer premises equipment (CPE) and terminates at a port on a node of the frame relay network. Although these private line connections allow data to be transferred very quickly between the CPE and the network, the lease costs can be high. For many users, the amount of data to be transferred via the frame relay network does not justify the cost of a dedicated private line. For example, remote offices that need to transmit data to a regional or national headquarters may only need to do so once per day, or even less frequently. Also, individual users may only need to access their office database occasionally and/or from remote locations (where leased lines may not be available).

On the other hand, many users transmit a significant amount of data via the frame relay network and cannot afford to lose their connection. Such users often are forced to lease multiple access lines to ensure that backup connections are available in case the primary connection to the network fails. These additional lines further increase the cost of frame relay network access for such users.

SUMMARY AND OBJECTS OF THE INVENTION

It is therefore an object of the present invention to provide a method for accessing a frame relay network without the use of dedicated access lines.

It is a further object of the present invention to provide an efficient means for providing access to a frame relay network in cases where a primary access line has failed.

These and other objects of the invention are achieved by the use of ANI-dormant connections in a frame relay network. In one embodiment, a frame relay network consists of a number of interconnected nodes and a network station. The network station includes a memory which stores a data base containing predefined circuit provisioning information for a number of users. A user accesses the frame relay network by dialing in to the network via an ISDN connection. When the user calls into the network, signaling information is received at a first node of the network and passed to the network station. The signaling information includes information which identifies the calling user, e.g., the ANI. The network station uses the signaling information to index the data base and retrieve associated circuit provisioning information. The circuit provisioning information is passed to a network management system which automatically provisions the circuit according to the predefined information. In this way, the user is provided with access to the frame relay network.

Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
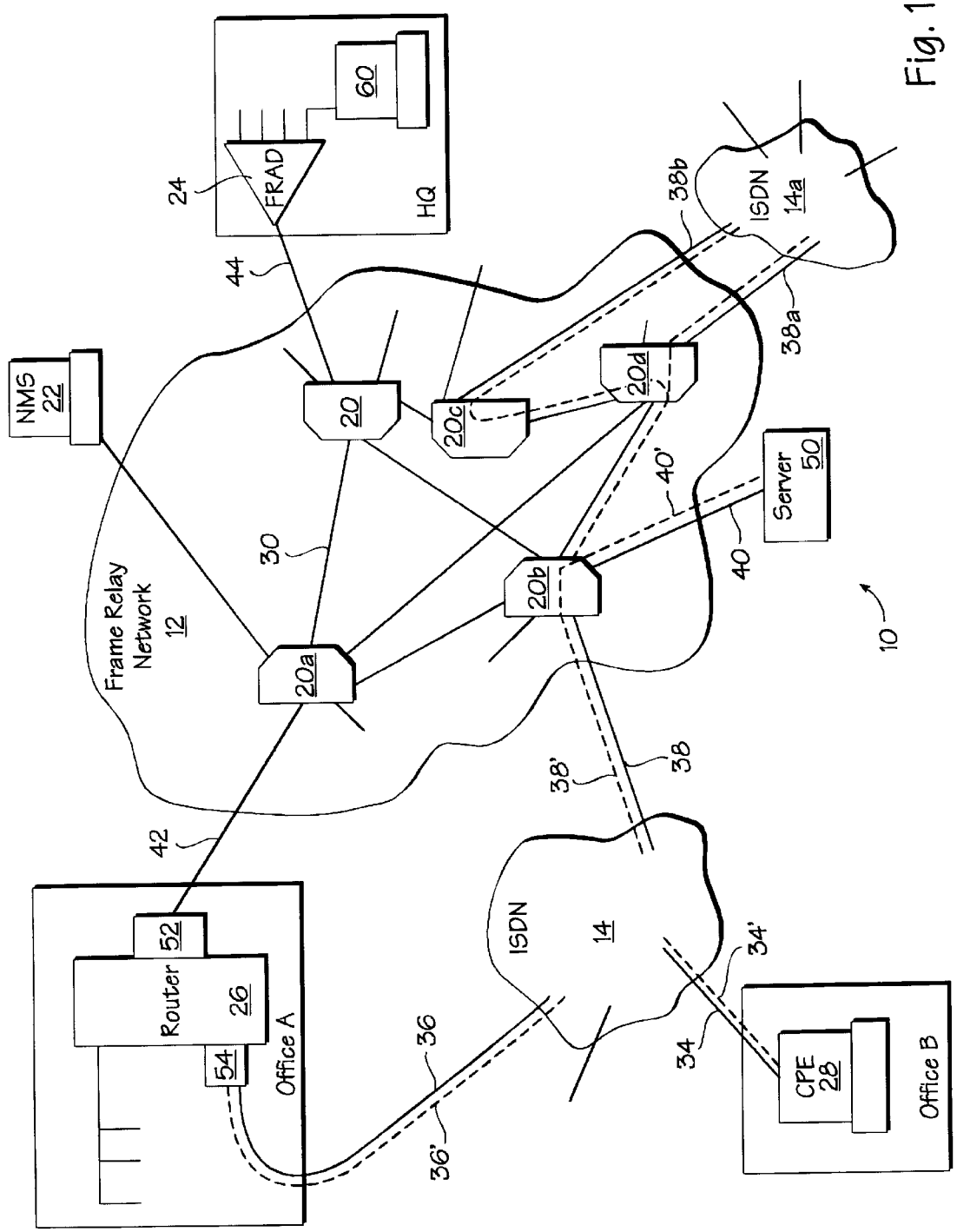
FIG. 1 illustrates a frame relay network configured to allow dial access in accordance with the present invention.

A method and apparatus to allow dial access to a frame relay network using ANI-dormant connections is described. According to one embodiment, users are connected to the network using predefined circuits which are provisioned according to automatic number identification.

As shown in FIG. 1, in a fully integrated frame relay network 12, a variety of switching nodes 20–20d are present. Each node 20–20d is interconnected to other network nodes 20–20d by a variety of transmission paths 30. (Note that for clarity only one transmission path 30 has been labeled. Those skilled in the art will appreciate that all of the transmission paths between network nodes 20–20d are substantially similar.) Each transmission path 30 supports a number virtual circuits.

Access to frame relay network 12 is accomplished in a variety of ways. For example, a host 60 located at a central office HQ accesses frame relay network 12 via frame relay access device (FRAD) 24. FRAD 24 is coupled to a network node 20 via a leased line 44. FRAD 24 encapsulates transmitted data from host 60 into the frame relay format for transport through network 12. As is known by those skilled in the art, FRAD 24 may be embedded in a bridge, a router (such as router 26 in remote office A), a multiplexer, or other stand alone device. Alternatively, FRAD 24 may be an expansion card with frame relay access functionality which is found within the chassis of host 60.

A local area network (LAN) located at Office A, accesses network 12 (as noted parenthetically above) via router 26. It will be appreciated that router 26 comprises a frame relay access device that performs the encapsulation function discussed above with regard to FRAD 24. A port 52 of router 26 is connected to a network node 20a via a second leased line 42, thereby allowing the LAN to access network 12.

The connections between the HQ and network 12 and between Office A and network 12 have been described as leased lines 42 and 44. This is more accurately a description of the physical connections into network 12. The logical connections are better described as virtual circuits. That is, when host 60 has data to be transmitted to the LAN at Office A via network 12, a circuit over leased line 44, through the network 12 and to router 26 over leased line 42 will be available. This circuit is known in the art as a permanent virtual circuit (PVC). Because the physical circuit may be over-subscribed, with many PVC's, other users of network 12 can transmit data over the same physical wires (or other transmission media) that may carry data between the HQ and Office A. The endpoints of the PVC are established at the time the users subscribe to the network service and the parameters which define the circuit (e.g., the network nodes 20–20*d*, the ports of these nodes to be used, etc.) are stored in fixed tables in memory.

Some user situations may not require (in terms of the amount of data to be transferred) or justify (in terms of the cost) the use of private access lines such as leased lines 42 and 44 to access network 12. Rather, some users may only need access to network 12 on a sporadic basis. Alternatively, there are situations where leased line 42 may fail. To ensure that such a failure does not eliminate the availability of access to network 12, users at Office A and/or the HQ may need to lease additional lines to provide backup capabilities. These backup lines may only be used once in a great while, and otherwise may remain idle. Regardless of whether the backup lines are being used, however, the users incur the lease costs associated with the backup lines.

To avoid the need for such "backup leased lines" and to allow users that only require infrequent access to network 12 to do so, the present invention provides a means for dial access to network 12. Dial access, as the term implies, allows users to dial into network 12 from any network that provides caller identification information, e.g., the ANI in an ISDN network, much like the public switched telephone network allows users to dial into the network to connect to other users. As further described below, network nodes 20–20*d* which have dial-up ports available, allow users to access network 12 from any connected ISDN network. The network 12 will automatically recognize the dialing-in user and provision a predefined circuit, regardless of the source point. In this way, remote users, for example, may access host 60 at the HQ from any ISDN connected location. This may include users at a remote office, such as Office B. In addition, users at Office A will have dial access to network 12 in the event leased line 42 fails. This avoids the costs associated with leasing a backup line and also allows users at Office A a means of gaining additional bandwidth on demand if circumstances so require. The manner in which dial access to network 12 is achieved will now be discussed.

Office B has access to frame relay network 12 via ISDN network 14. Customer premises equipment (CPE) (e.g., a LAN, a personal computer, etc.) 28 at Office B is coupled to ISDN network 14 via ISDN basic rate interface (BRI) 34. ISDN network 14 is coupled to a frame relay network node 20*b* via ISDN primary rate interface (PRI) 38.

Those skilled in the art will appreciate that BRI 34 and PRI 38 include several logical channels. These channels are generally referred to as B-channels and D-channels. D-channels carry signaling information between a user and an ISDN network and are represented by the dashed lines 34' and 38'. The dashed lines 34' and 38' do not represent independent physical media. The dashed lines 34' and 38' merely represent the signaling channel carried on the transmission media. The B-channels carry information for user services, including audio, video, and digital data. BRI 34 comprises two B-channels and one D-channel and is typically designated 2B+D. PRI 38 comprises 23 B-channels and one D-channel and is designated (23B+D). (Those skilled in the art will appreciate that this is a typical PRI configuration for North America and Japan. Other nations may use a PRI configured as 24B or 30B+D. Such configurations are within the scope of this invention and the use of PRI 38 in FIG. 1 with 23B+D is exemplary only.)

As is known in the art, ISDN network 14 comprises a number of switches, local loop terminators, and local exchanges. These devices allow interconnection between users and the manner in which signaling information and user services are transmitted between these devices is well known. The present invention makes use of certain signaling information carried on the D-channel to allow interconnection to frame relay network 12.

When a user, commonly referred to as a calling party, initiates a call over an ISDN line, a SETUP message is transmitted from the calling party to the ISDN network. For purposes of the present invention, the SETUP message transmitted by the calling party must include the calling party's automatic number identification (ANI) information, or some translation thereof done at the PSTN switch. The ANI uniquely identifies the calling party and will allow for automatic provisioning of a circuit within frame relay network 12 as described below. The ANI is transmitted in accordance with the format specified by CCITT Recommendation Q.931. That is, the ANI is included as an information element transmitted over the D-channel during the establishment of the call.

For the situation depicted in FIG. 1, when a user at Office B wishes to communicate with the host 60 at the HQ via network 12, the user places a call from CPE 28 to establish a network connection. CPE 28 initiates an ISDN call via ISDN network 14. This call initiation includes signaling information which is carried on the D-channel of the ISDN BRI 34. The signaling information includes the ANI of CPE 28. The called party's number from CPE 28 allows ISDN network 14 to route the call through ISDN network 14 to a port of network node 20*b* of frame relay network 12 via ISDN PRI 38. The port of network node 20*b* is configured such that the necessary encapsulation which will allow ISDN-formatted information from CPE 28 to be transported across frame relay network 12 is carried out.

In accordance with the present invention, the signaling information from CPE 28 is transported to server 50. Server 50 is coupled to network node 20*b* by a transmission path 40. Transmission path 40 supports the logical connections required to transport the signaling information, including the CPE 28 ANI, from network node 20*b*. It will be appreciated that although the signaling information from CPE 28 originally conformed to the format specified by the Q.931 Recommendation, the signaling information may have been reformatted to conform to another protocol supported by network node 20*b* and server 50. Regardless of this reformatting, the ANI information will still be present. The dashed line 40' indicates that it is this original signaling information which is transported to server 50.

At server 50, the signaling information is decoded and the ANI for CPE 28 is retrieved. A processor (not shown) associated with server 50 uses this ANI to access a data base stored in a memory (not shown). The data base contains predefined circuit provisioning information for a number of users, including CPE 28. The ANI transmitted by CPE 28 is used to locate the appropriate circuit provisioning information (e.g., nodes, ports, etc.) that will allow CPE 28 to connect to host 60 at the HQ. This information will allow a virtual circuit to be established to connect CPE 28 to host 60.

Unlike the above situation where the establishment of an appropriate PVC between host 60 and router 26 depended upon the use of leased lines coupled to predefined ports of network nodes, the virtual circuit which will be established between CPE 28 and host 60 is independent of a leased line at the source.

The circuit provisioning information stored in the memory associated with server 50 is predefined. That is, some time prior to the call placed by CPE 28, appropriate provisioning information was established. Typically, this information will be established at the time a user subscribes to network 12. The subscriber's (e.g., CPE 28) ANI will be associated with the desired endpoint and the information stored in the data base. For the case of CPE 28, the information to be stored would include the appropriate port of node 20 so as to allow CPE 28 to connect with host 60. In this way, whenever the ANI associated with CPE 28 is received by server 50, regardless of the origin point, CPE 28 will always be connected to the appropriate port at node 20 to allow communication with host 60. Those skilled in the art will appreciate that some users may require a point-to-multipoint connection within network 12 so as to allow communication between multiple users. For example, CPE 28 may need to be connected to both host 60 at the HQ and to the LAN at Office A. This type of connection information can be accommodated in the data base, again associated with the appropriate ANI of the calling party.

After the circuit provisioning information corresponding to the ANI associated CPE 28 is retrieved from the data base, server 50 provides the circuit provisioning information to network management system (NMS) 22. NMS 22 receives the circuit provisioning information and automatically establishes the appropriate virtual connection (e.g., between network nodes 20b and 20). In this way, CPE 28 is connected to host 60 at the HQ. The virtual connection between the host 60 and CPE 28 is referred to as an ANI-dormant connection because, although previously provisioned, the connection remains dormant until activated by the recognition of the ANI associated with CPE 28.

As shown in FIG. 1, other network nodes 20c and 20d are connected to ISDN network 14a via ISDN PRIs 38a and 38b. These connections allow users with access to ISDN network 14a to dial access other ANI-dormant connections in the manner described above. For the example shown in FIG. 1, all switching information from all ISDN PRIs is transported to server 50, however, those skilled in the art will appreciate that the function of server 50 (i.e., retrieving the circuit provisioning information according to the received ANI) could be provided by a number of servers at various locations or by network nodes which included the appropriate data base information.

Another example of the flexibility offered through the use of ANI-dormant connections is described with reference to Office A, shown in FIG. 1. As discussed above, Office A has access to network 12 via leased line 42. In the event leased line 42 fails, or in situations where Office A requires additional bandwidth, Office A can be coupled to network 12 in a manner similar to that described above for Office B. Router 26 at Office A is coupled to ISDN network 14 via ISDN BRI 36. When required, ISDN calls are placed from Office A via BRI 36 to ISDN network 14. These calls are transported through ISDN network 14 through to an appropriate port of network node 20b via ISDN PRI 38. Again, the ISDN call will contain signaling information on the D-channel which is transferred to server 50. This time, the signaling information will include an ANI associated with router 26. The signaling information is properly formatted at node 20b and transported to server 50. At server 50, the signaling information is decoded and the ANI associated with router 26 is retrieved. Server 50 uses the ANI to index the data base and retrieve the appropriate circuit provisioning information which allows office A to be connected to the HQ. This circuit provisioning information is then provided to NMS 22 and the appropriate virtual circuit connecting Office A to the HQ is established.

Thus, an efficient method for providing dormant-ANI connections has been described. In the foregoing specification, the invention has been described with reference to specific exemplary embodiments thereof. It will, however, be clear that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of automatically installing a circuit between a first node of a plurality of nodes and a second node of the plurality of nodes comprising the steps of:

receiving at the first node a data signal, the data signal comprising a call identifier, the call identifier uniquely indicating a calling party;

providing the call identifier to a network station, the network station using the call identifier to retrieve corresponding circuit provisioning information for a frame relay connection within a data communication network according to the call identifier; and using the corresponding circuit provisioning information to automatically install the frame relay connection between the first node and the second node.

2. The method of claim 1 wherein the call identifier comprises automatic number identification (ANI) information.

3. A data communication network station comprising a data base storing predefined circuit provisioning information for a plurality of circuits, each of the circuits representing frame relay connections in a data communications network comprising a plurality of nodes, the predefined circuit provisioning information being associated with corresponding calling party identifier information such that the predefined circuit provisioning information in capable of being accessed using the calling party identifier information.

4. A data communication network station as in claim 3 wherein the calling party identifier information comprises automatic number identification (ANI) information.

5. A method, comprising:

receiving, as signaling information from an ISDN network at a node of a digital network, calling party identification information indicating a source of data to be transported within the digital network; and provisioning a frame relay connection within the digital network in response to receiving the calling party identification information.

6. The method of claim 5 wherein the calling party identification information comprises an automatic number identifier (ANI).

7. The method of claim 5 wherein the step of provisioning further comprises automatically establishing the connection defined by the predefined circuit provisioning information.

8. A method, comprising:

receiving at a node of a digital network, calling party identification information indicating a source of data to be transported within the digital network; and provisioning a frame relay connection within the digital network in response to receiving the calling party identification information by retrieving predefined circuit provisioning information from a data base associated with the digital network, the predefined circuit provisioning information defining the frame relay connection associated with the calling party identification information.

9. The method of claim 8 wherein the step of provisioning further comprises automatically establishing the connection defined by the predefined circuit provisioning information.

10. The method of claim 8 wherein the calling party identification information comprises an automatic number identifier (ANI).

11. A digital network, comprising:

a node configured to receive calling party identification information indicating a source of data to be transported within the digital network as signaling information from an ISDN network; and means for provisioning a frame relay connection within the digital network in response to receiving the calling party identification information coupled to the node.

12. The digital network of claim 11 wherein the calling party identification information comprises an automatic number identifier (ANI).

13. A digital network, comprising:

a node configured to receive calling party identification information indicating a source of data to be transported within the digital network; and means for provisioning a frame relay connection within the digital network in response to receiving the calling party identification information coupled to the node, wherein the means for provisioning comprises a data base storing predefined circuit provisioning information defining the connection within the network associated with the calling party identification information.

14. The digital network of claim 13 wherein the means for provisioning further comprises a network management system configured to receive the predefined circuit provisioning information from the data base and to automatically establish the connection in response thereto.

15. The digital network of claim 13 wherein the calling party identification information comprises an automatic number identifier (ANI).

16. The digital network of claim 13 wherein the node is further configured to receive the calling party identification information as signaling information from an ISDN network.

* * * * *